Nov. 29, 1960     J. R. HOFFMAN ET AL     2,962,706
AERIAL NAVIGATION AID
Filed March 18, 1957     3 Sheets-Sheet 1
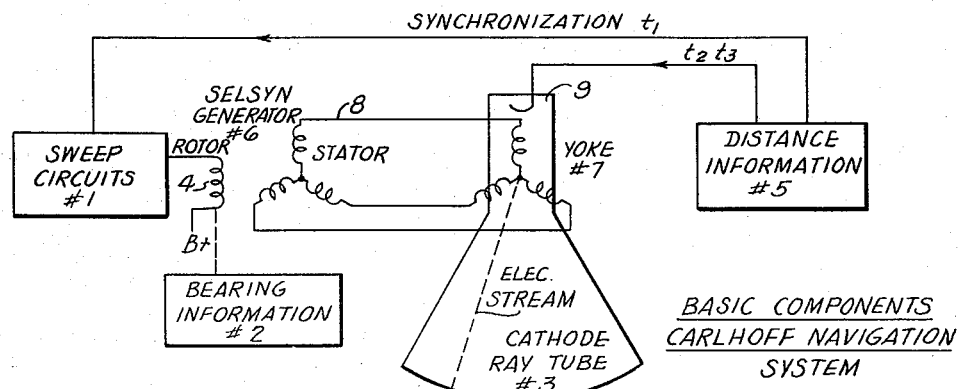
BASIC COMPONENTS CARLHOFF NAVIGATION SYSTEM
Fig. 1
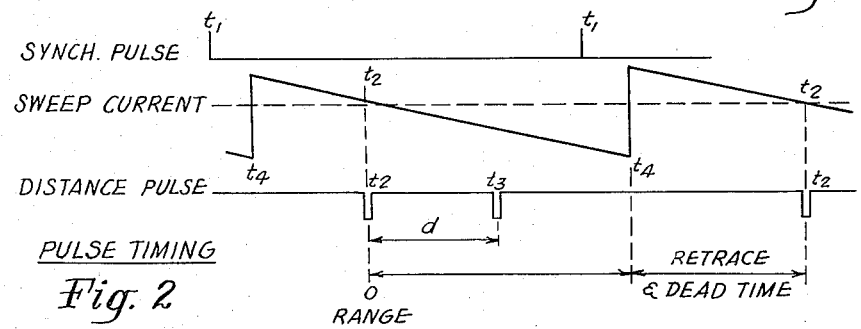
PULSE TIMING
Fig. 2
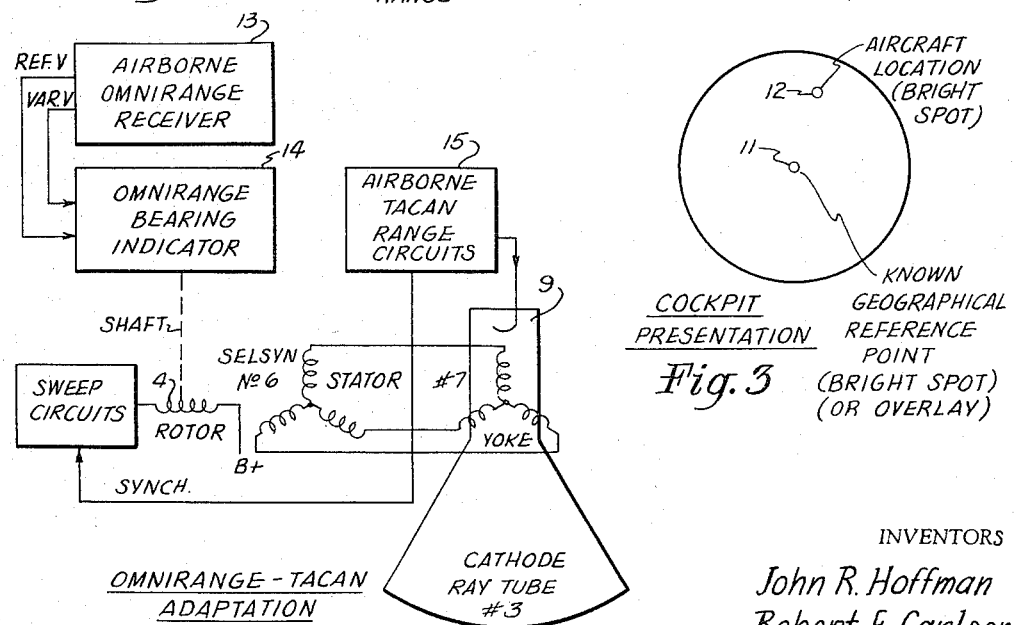
OMNIRANGE-TACAN ADAPTATION
Fig. 4
COCKPIT PRESENTATION
Fig. 3
INVENTORS
John R. Hoffman
Robert E. Carlson
BY Arthur Vinograd
Leonard F. Stoll    ATTORNEY
                  AGENT

BASIC NAVIGATOR

TACAN ADAPTATION

INVENTORS
John R. Hoffman
Robert E. Carlson
BY Arthur Vinograd
Leonard F. Stoll
ATTORNEY
AGENT

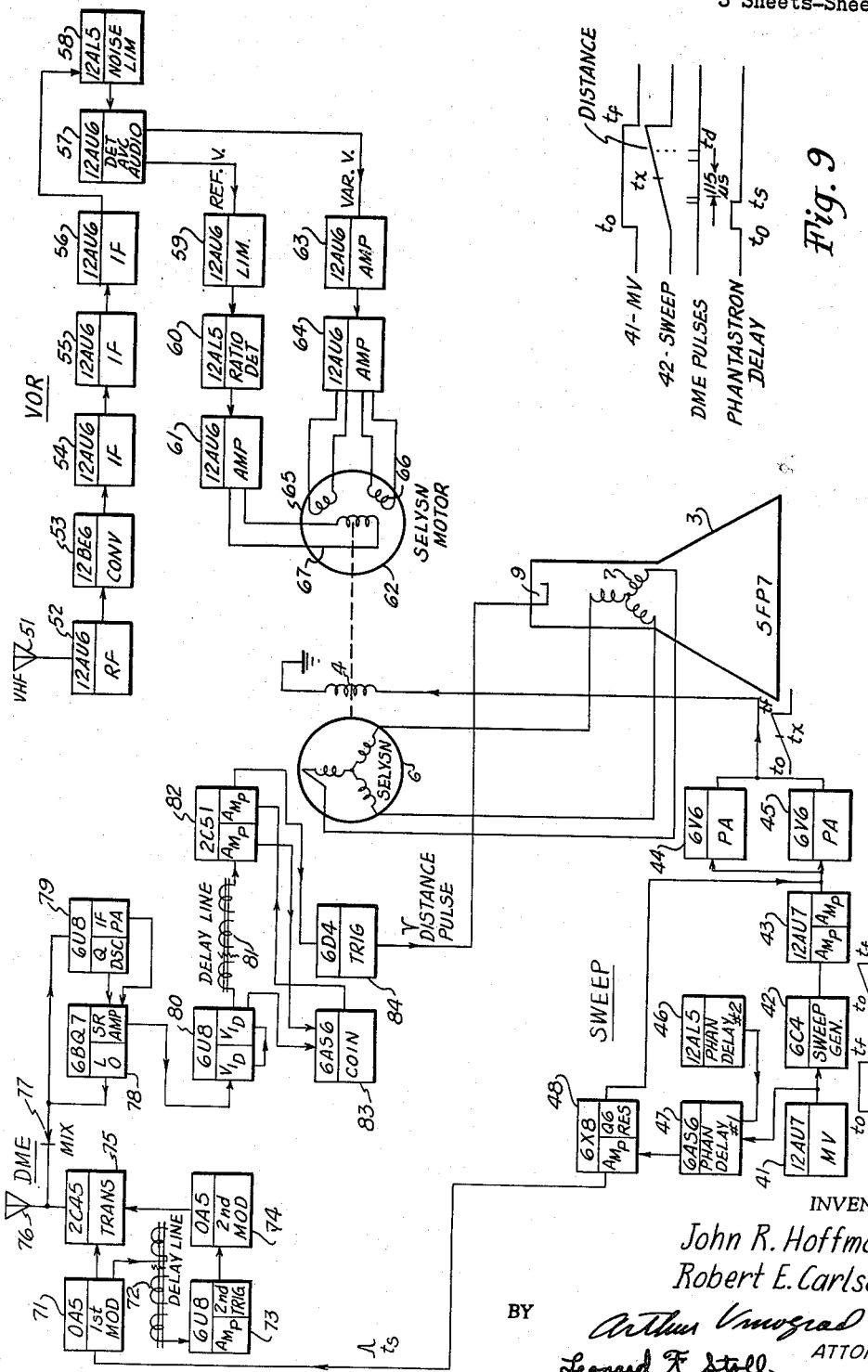

United States Patent Office 2,962,706
Patented Nov. 29, 1960

2,962,706
AERIAL NAVIGATION AID

John R. Hoffman, 216 Raines St., Plainfield, Ind., and Robert E. Carlson, 21509 Villena Ave., Woodland Hills, Calif.

Filed Mar. 18, 1957, Ser. No. 646,940

2 Claims. (Cl. 343—6)

(Granted under Title 35, U.S. Code (1952), sec. 266)

The invention described herein may be manufactured and used by or for the Government of the United States for governmental purposes without the payment to us of any royalty thereon, in accordance with the provisions of 35 United States Code (1952), section 266.

The present invention is concerned with an aid to air navigation and more particularly is directed to a cathode-ray tube pictorial display device for presenting a visual representation of position information to the pilot in the cockpit of an aircraft.

Prior art navigation aids based on distance and bearing information have many serious disadvantages. Some of the most important are the heavy workloads imposed on the flight crew with the attendant possibilities of human error, the restriction of flight courses to the following of airway or radial paths from a ground radio aid, the necessity for large buffer zones between adjacent flight paths, and the necessity for basing many flight and holding patterns on time considerations rather than on direct physical position information.

The present invention obviates the above-mentioned disadvantages by providing in the cockpit a visual picture of the aircraft position over the geographical area serviced by the known source of position information. Through the use of overlays or geographical charts the present invention provides the pilot with a continuous picture representation of the passage of his aircraft over a specified ground surface area, making it possible to fly any desired path directly by sight as pictured on the display.

It is therefore one object of this invention to provide an improved navigation display device which permits navigation in all available airspace with a minimum of ground radio aids.

Another object of this invention is to provide an air navigation aid which substantially reduces the cockpit navigation workload of the flight crew.

Still another object is to provide an air navigation aid which eliminates possible sources of human error and contributes to the increased safety of air navigation.

A further object of this invention is to provide a visual display device for air navigation which permits navigation along any desired flight path.

Other uses an advantages of the invention will become apparent upon reference to the specification and drawings, in which:

Fig. 1 shows in block form the basic circuit elements of the navigational aid of the present invention;

Fig. 2 is a timing diagram for the circuit of Fig. 1;

Fig. 3 shows the cockpit cathode-ray-tube presentation of the instant invention;

Fig. 4 shows the navigational aid of the present invention adapted for use in conjunction with omnirange bearing information and tacan distance information;

Fig. 8 is a detailed block diagram of the navigational aid of the present invention utilizing omnirange bearing information and DME distance information; and Fig. 9 is a simplified timing diagram for the circuit of Fig. 8.

Figure 6:
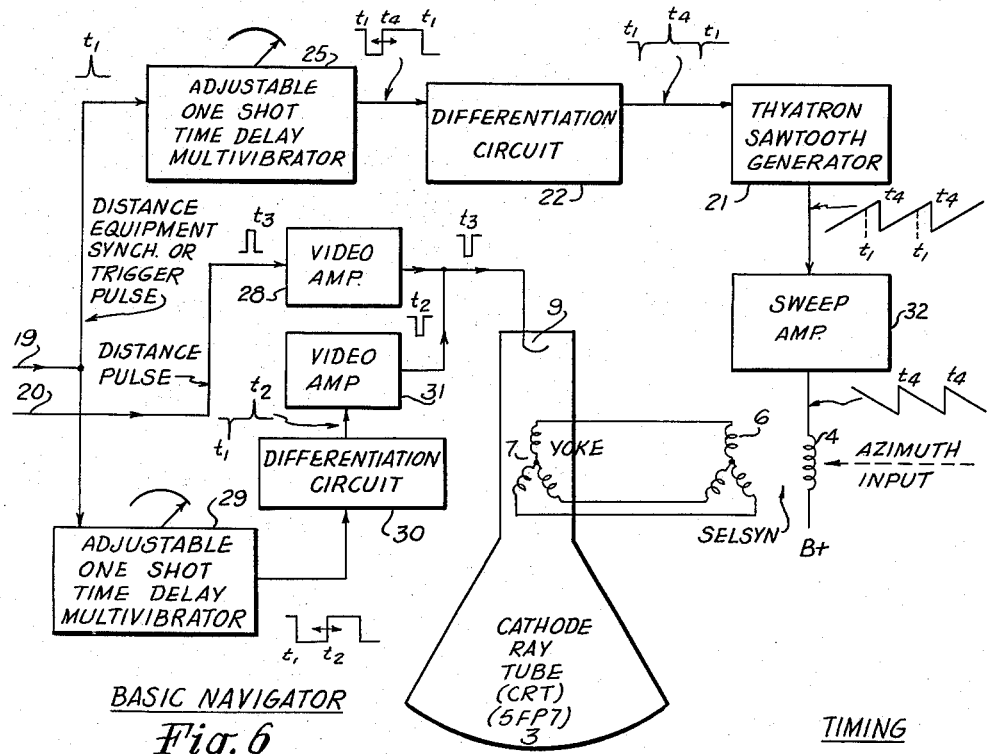
Fig. 6 is a more detailed block diagram of the basic circuitry of Fig. 1.

Referring to the drawings, in Fig. 1 is shown in simplified form the basic circuitry involved in the present invention. A sweep circuit 1 is energized by synchronization signals from a distance information source 5 and is in turn connected to the rotor 4 of a selsyn generator 6. The position of rotor 4 is determined by bearing information derived from bearing information source 2 shown coupled to rotor 4 by a dotted line. The three-winding stator 8 of selsyn generator 6 is connected to a three-winding deflection yoke 7 surrounding the neck of a cathode-ray display tube 3. Distance information from source 5 is supplied to cathode 9 of display tube 3.

Sweep circuit 1 generates a sawtooth wave form which is fed to selsyn rotor 4. The angular position of rotor 4 is determined by the output from bearing information source 2 whose output shaft rotation is a function of the bearing from a known geographical reference point to the aircraft. The sawtooth wave form from rotor 4 is coupled to the three windings of stator 8 in varying amplitudes; the particular amplitude in each winding depending upon the angular position of rotor 4. The stator signal is in turn coupled to yoke 7 of display tube 3, the different magnitude signals in each winding of yoke 7 producing a magnetic field in yoke 7 that is magnetically aligned with the angular position of rotor 4. The amplitude of the yoke field increases in accordance with the increase in the sawtooth waveform in rotor 4. As a result, the electron beam of cathode-ray-display tube 3 is deflected along a diameter of the tube face, the angle of said diameter representing the bearing of the aircraft from the known geographical reference point.

Distance information derived from distance information source 5 is applied to cathode 9 of cathode-ray tube 3 to produce a spot on the face of tube 3. The distance of the spot from the center of the tube represents the distance of the aircraft from the known reference point.

Fig. 2 shows a pulse timing diagram for the generalized circuit of Fig. 1. Synchronization pulses, to be more fully explained later, are derived from the distance information source 5 and serve to initiate and control the operation of sweep circuit 1. The sweep is initiated at time $t_4$, a fixed time interval after the synchronization pulse at time $t_1$. A zero range pulse occurring at time $t_2$ and governed by adjustable delays within the circuit of source 5 provides means for centering the sweep and providing a spot at the center of the face of cathode-ray tube 3 to indicate the position of the known reference point. The pulse at time $t_3$ from the distance information circuit 5 represents the end of the distance measuring period. The time $d$ between pulses $t_2$ and $t_3$ is a function of the distance from the aircraft to the reference point.

Fig. 3 indicates the display as appearing on the face of cathode-ray tube 3. At 11 is shown the bright spot produced by pulse $t_2$ of Fig. 2 representing the position of a known geographical reference point. If desired, pulse $t_2$ may be omitted and the reference point may be indicated by a suitable overlay placed on the face of the tube. The bright spot indicated at 12 is caused by pulse $t_3$, and the distance between spots 11 and 12 represents the distance obtained from circuit 5. The aircraft and ground reference spots may be interchanged by merely reversing the connections to rotor 4 of selsyn generator 6 of Fig. 1.

Fig. 4 shows the basic circuit of Fig. 1 as modified for use with omnirange bearing information and tacan distance or range information. Omnirange and tacan systems as such are well known in the navigation art and form no part of the present invention. An omnirange system suitable for use with the present invention is disclosed in Civil Aeronautics Administration Technical Development Report No. 113, June 1950, and tacan operation is fully described in an International Telephone and Telegraph publication entitled "Electrical Communication," March 1956, vol. 33, No. 1.

Like elements of Fig. 4 are accorded like numerals corresponding to the same elements in Fig. 1.

An airborne omnirange receiver 13 supplies reference in variable voltages to an omnirange bearing indicator 14 in a well-known manner. Indicator 14 is coupled to rotor 4 of selsyn generator 6 by means of a shaft indicated by a dotted line. Airborne tacan range circuits 15 corresponding to distance information circuit 5 of Fig. 1 supply distance pulses to cathode 9 of tube 3. The remaining circuitry of Fig. 4 is identical to that of Fig. 1. The operation of the specific embodiment of Fig. 4 is similar to the operation of the general circuit of Fig. 1, and no further elaboration is deemed necessary.

Figure 5:
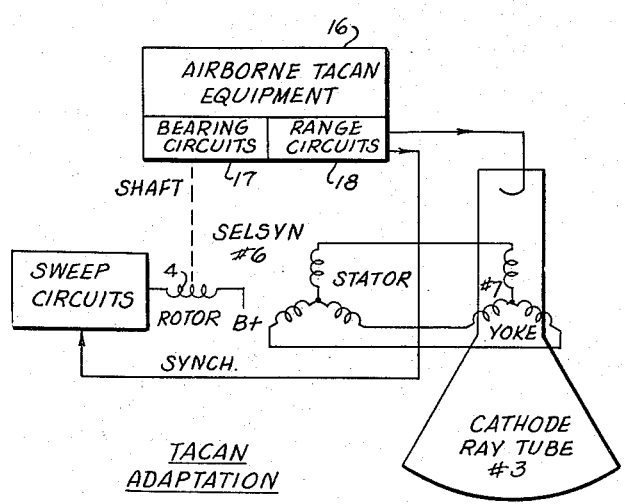
Fig. 5 shows the navigational aid of the present invention utilizing tacan for both bearing and distance information.

Fig. 5 illustrates a specific embodiment similar to that of Fig. 4 in which tacan alone is used for both bearing and range information. In place of circuits 13, 14, and 15 of Fig. 4, a single tacan airborne system 16 is utilized, including bearing information circuits 17 and range or distance information circuits 18. The remaining circuitry and operation of this embodiment is similar to those shown in Figs. 1 and 4.

Fig. 6 is a more detailed diagram of the basic navigation aid of the present invention as disclosed in Fig. 1. The particular circuits shown in block form are conventional.

A distance information source (not shown) applies a synchronization pulse $t_1$ via lead 19 to each of two adjustable one-shot time-delay multivibrators 25 and 29. These multivibrators go through one cycle of operation and then wait for another synchronous pulse. The first half-cycle of operation of each multivibrator can be adjusted so that the spacing of pulses $t_2$ (multivibrator 29) and $t_4$ (multivibrator 25) can be varied with respect to the synchronous pulse $t_1$.

The output of multivibrator 29 is adjusted so that $t_2$ occurs when the sweep is at the center of the display. This timing will vary with the pulse repetition frequency of the synchronous source, with the range scale, and with the size of cathode-ray tube being used.

The rectangular wave form output of multivibrator 29 is differentiated by differentiation circuit 30 and fed to a video amplifier 31. Amplifier 31 is biased to cut-off so that the negative output from circuit 30 is blocked and only the positive differentiated pulse produces a negative pulse output from the amplifier. This negative pulse $t_2$ from amplifier 31 is applied to cathode 9 of cathode-ray tube 3 and results in a bright spot at the center of the tube face representing zero range.

The output of multivibrator 25 is differentiated in differentiation circuit 22 and the positive pulse $t_4$ used to trigger a thyratron sawtooth generator 21. Generator 21 is designed so that it has a natural frequency slightly lower than the pulse repetition frequency of the synchronization pulses.

It may be noted that should the synchronization source fail, generator 21 would continue to generate a sweep voltage at its natural frequency. In such a case the bearing information at least could be displayed by simply increasing the beam intensity of cathode-ray tube 3.

The negative portion of the output from differentiation circuit 22 can be bypassed to ground with a diode, but this is not necessary since it will not trigger sawtooth generator 21, and its presence at the input thereof is harmless.

A sweep amplifier 32 inverts the sawtooth wave form and energizes selsyn rotor 4. The position of rotor 4 is determined by the bearing or azimuth information input coupled to it by way of a shaft indicated by the dotted line in Fig. 6.

A distance pulse $t_3$ is supplied by lead 20 to a video amplifier 28, where it is amplified, inverted, and applied to cathode 9 of cathode-ray tube 3. The delays of both multivibrators 25 and 29 may be adjusted to compensate for delays in the ground equipment as well as inherent delays in the aircraft sending and receiving circuits so that the distance pulse $t_3$ coincides with pulse $t_2$ at zero range and with pulse $t_4$ at maximum range.

Figure 7:
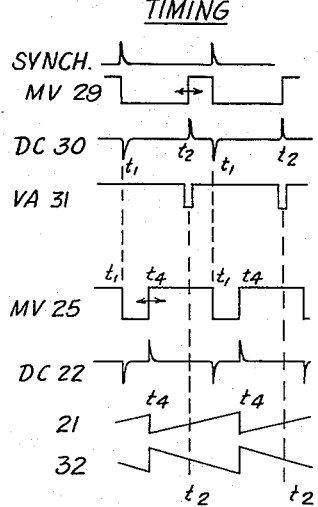
Fig. 7 is a timing diagram for the circuit of Fig. 6.

Fig. 7 shows a timing diagram for the presentation circuitry of Fig. 6. In the drawing $t_1$ represents the synchronization pulse. This pulse may be derived from the transmitting portion of conventional distance measuring equipment. As is well known, distance measuring equipment, such as tacan and the even better known DME, operates on the principle of interrogation and reply with fixed delays incorporated in the ground answering equipment. The interrogation pulse from such a distance measuring transmitter represents a convenient source of synchronization pulses for the display circuit of the present invention and may be coupled to the circuit of Fig. 6 by lead 19 as indicated.

Pulse $t_2$ of Fig. 7 is the zero range pulse and is derived from the synchronization pulse $t_1$ as described. The spacing of pulse $t_2$ is variable and is adjusted to center on the face of cathode-ray tube 3. Pulse $t_4$ likewise derived from synchronization pulse $t_1$ serves to initiate a sweep cycle. The distance pulse $t_3$ being variable with range is not shown in Fig. 7; however, it will always appear between pulse $t_2$ and pulse $t_4$ if the equipment is properly adjusted and the maximum displayed distance is not exceeded.

The various wave forms of Fig. 7 are labeled in accordance with the particular element of Fig. 6 with which element the wave form is associated as the output therefrom. The first wave form represents the synchronization pulses on lead 19, followed by the output square wave form from multivibrator 29, the differentiated output of circuit 30, the pulse output of amplifier 31, the square wave output of multivibrator 25, the differentiated output of differentiator 22, the sawtooth generator output of generator 21 and the inverted sawtooth output of sweep amplifier 32, respectively.

Fig. 8 shows a detailed block diagram excluding power supplies of an entire airborne unit embodying the pictorial navigational aid presentation circuit of the instant invention and utilizing a VOR or omnirange system for bearing information and a DME system for range information. DME systems are well known in the art, one such system being described in Civil Aeronautics Administration Technical Development Report No. 114, June 1950, entitled, "UHF Distance Measuring Equipment for Air Navigation."

The sweep circuit generally labeled "Sweep" in Fig. 8 consists of a free-running multivibrator 41, a sweep generator 42, twin amplifiers 43, a pair of sweep drivers 44 and 45, two phantastron delay circuits 46 and 47, and an amplifier-D.C. restorer circuit 48. The sweep circuit is of the vacuum tube sawtooth generator type. The free-running multivibrator 41 generates a rectangular waveshape and sets the basic pulse repetition frequency for the system. The sweep generator output voltage rises in an approximately linear fashion for the duration of the positive portion of the multivibrator output from time $t_0$ to $t_f$. The sweep voltage is amplified and applied to the rotor 4 of selsyn generator 6.

The VOR or omnirange portion of the circuit is conventional. Signals applied to an antenna 51 pass through an RF amplifier 52, a converter stage 53, and a series of I-F amplifiers 54, 55, and 56, a noise limiter 58 to a detector-automatic volume control circuit 57. Signals supplied to circuit 57 are limited by the action of circuit 58.

A reference signal output from circuit 57 passes through a limiter 59, a ratio detector 60, and an amplifier 61 to the rotor portion 67 of a selsyn motor 62. A variable signal output from circuit 57 passes through a pair of pentode amplifier stages 63 and 64 where it is split into two signals and applied to two stator windings 65 and 66 of selsyn motor 62.

In operation the VOR receiver converts a very high frequency modulated continuous wave signal into two 30-cycle voltages which shift 360 degrees in phase as the airborne receiver circumscribes the ground transmitter located at the ground reference point. The signals are separated by superheterodyne detector, and filter circuits. The 30-cycle signals are used to position selsyn motor 62, whose rotor 67 is connected by a shaft shown in dotted lines to the rotor 4 of selsyn generator 6 in the display circuit.

The present VOR composite signal contains a VHF (112 to 118 mc.) carrier, a 9.96 kc. subcarrier frequency modulated by a 30-cycle reference (REF) signal and a 30-cycle amplitude modulation or variable (VAR) signal. The RF amplifier stage 52 amplifies the VHF carrier and the converter 53 "beats" down the carrier to a suitable I-F frequency (the exact I-F frequency is a design choice) where it is amplified by amplifiers 54, 55, and 56. The noise limiter stage 58 is a double diode limiter circuit which limits both negative and positive extremities of the voltage input to the detector 57. The DET-AVC-Audio stage 57 performs two functions. The diode portion of the tube is used as an AVC diode detector circuit, maintaining constant output for signals of varying input amplitude. The triode portion is used as a plate detector circuit and separates the 30-cycle amplitude modulated VAR signal from the carrier. The VAR signal is fed through two pentode amplifiers 63 and 64 where it is phase split into two voltages in space and time quadrature. The two VAR voltages, separated 90 degrees electrically, are applied to the two stator windings 65 and 66 of the selsyn motor 62, which are displaced 90 degrees in space, thus resulting in a 30-cycle per second rotating field. The REF signal is amplified by the limiter stage 59 and the 30-cycle frequency modulated REF signal is separated in the Radio Detector (discriminator) circuit 60, amplified, and applied to the selsyn rotor 67. So long as the REF signal maintains its phase relation to the VAR signal, the rotor will remain stationary, but, as the aircraft changes its bearing from the VOR ground station, the voltages shift in phase and the selsyn rotor will move correspondingly so that the rotor field will be aligned with the stator field (both fields are fluctuating at a 30-cycle-per-secionod rate). The relative phase shift of the VAR and REF signals as a function of bearing is a characteristic of the ground equipment and outside the scope of this description. The VAR and REF signals are in phase at a north bearing from the ground station and the REF signal shifts one degree electrically for each degree of bearing as the ground station is circled. The selsyn motor 62 shaft rotation positions the selsyn generator rotor 4 and the cathode-ray tube sweep is positioned as described above.

The distance measuring equipment generally labeled DME in Fig. 8 is also conventional. The transmitter portion of the circuit includes a first modulator 71, a delay line 72, an amplifier and second trigger circuit 73, a second modulator 74, transmitter 75, and an antenna 76.

The receiver portion of the DME equipment includes a mixer 77, a local oscillator and superregenerative amplifier circuit 78, and a squelch oscillator and pentode amplifier 79. Also included is a pair of video amplifiers 80, a delay line 81, another pair of amplifiers 82, a coincidence circuit 83, and a trigger circuit 84. The output distance pulse from trigger 84 is applied to the cathode 9 of display tube 3.

Fig. 9 shows a timing diagram for the circuit of Fig. 8 in which $t_0$ represents a zero time reference, $t_x$ represents the time the sweep is at the center of the face of tube 3, and $t_s$ represents the time for the first transmitted pulse. The time of $t_s$ must precede the time of $t_x$ by the sum of the ground equipment delay, which is approximately 115 microseconds, and the pulse spacing of the interrogation pulses or mode delay. The end of a sweep cycle is represented by $t_f$. The time $t_d$ indicated as the time interval between the second transmitted pulse and the second received pulse is a function of the distance between the airborne equipment and a ground transponder situated at the geographical reference point.

The DME airbrone equipment transmits a pulse pair which interrogates the ground DME transponder and causes it to reply to the interrogation by transmitting a pulse pair. The two-way RF propagation time is proportional to the distance to the ground station. The DME pulse pair received from the ground station is decoded and applied to the cathode 9 of the cathode-ray tube 3 resulting in a bright spot at the proper bearing and distance.

The DME equipment is designed so that the time from the second interrogation pulse to the second reply pulse is 115 microseconds at 0 range, and it increases proportionately with range. The 115 microsecond delay is introduced in the ground transponder. Since the sweep crosses the cathode-ray tube center at time $t_x$ it is necessary for the second interrogation pulse to precede $t_x$ by 115 microseconds, and the first interrogation pulse to precede time $t_x$ by 115 microseconds plus the mode spacing (14 to 77 μs.). It can be seen that $t_s = t_x - 115$ μs.—mode delay. This is accomplished by the use of phantastron delay circuit 47.

The delay of circuit 47 is adjustable, and it is equal to the elapsed time from $t_0$ to $t_s$. The time from $t_s$ to $t_x$ varies with the mode (interrogator pulse spacing) between approximately 129 μs. and 192 μs. But $t_x$ is not a fixed time since it varies with pulse repetition frequency, range scale, sweep linearity and other factors. For this reason, it is not possible to put fixed limits on the phantastron delay. Its purpose is to eliminate a fixed range error in the display. In practice, the phantastron delay 47 is adjusted so that the distance pulse is at the center of the cathode-ray tube when the aircraft is over the ground station at low altitude. Phantastron delay 46 (12AL5 dual diode) is used as a control grid and plate clamper and is necessary for the accuracy and stability of delay 47. Phantastron delay 46 does not add to or subtract from the delay of PHAN delay 47. The output of PHAN delay 47 is differentiated in the amplifier 48 (6×8 pentode) grid circuit, amplified, and applied as a trigger to modulator 71. The D.C. restorer 48 is operated as a diode and is used to clamp the input to sweep amplifiers 44 and 45.

The DME transmitter is modulated at time $t_s$, the first modulator pulse is delayed by delay line 72 (14–77 μs.) and the transmitter is modulated again for the second transmitted pulse at time $t_x$–115 μs.

The DME receiver is a superregenerative type. The RF pulses from the ground equipment are mixed with the local oscillator energy and the I-F amplified in I-F amplifier 79. The oscillator-amplifier 78 shown is a dual triode tube. The superregenerative amplifier is actually a form of detector. The Q (Quench) oscillator output is fed to the plate circuit of the amplifier, resulting in regeneration. This type of receiver requires delicate adjustment, but a large gain is possible with very few tubes. The detected output is amplified by amplifiers 80 and applied to the control grid of the coincidence tube 83. The received pulses are also delayed in mode delay line 81 and fed to the suppressor grid of the tube 83. The decoded (single pulse) output is amplified and used to fire a gas tube trigger circuit 84, resulting in a large, sharp, negative distance pulse which is applied to the cathode 9 of cathode-ray tube 3.

The mode delay is determined when it is decided which ground facility is to be interrogated. The pulse spacings (air-to-ground and ground-to-air) are from 14 to 77 μs. in 7 μs. steps. The proper DME transmitter and receiver frequencies, mode, and VOR receiver frequency are grouped into channels and are all selected at the time it is decided to navigate using a particular ground facility.

The different modifications of the present invention shown in the drawings indicate that it is readily adapted to the various bearing and range systems now on use. The basic elements to be supplied by the navigation equipment are bearing and range information. The general circuit of Fig. 1 and the specific modifications of Figs. 4 and 5 contemplate the utilization of synchronization pulses from the interrogation circuits of a conventional tacan system. The embodiment of Fig. 8 on the other hand illustrates the use of the navigational presentation system of the present invention independently, with auxiliary synchronization incorporated in a sweep circuit separate from the range finding system.

It is obvious that other combinations of navigation information sources might be employed in conjunction with the present invention.

It will be apparent that the embodiments shown are only exemplary and that various modifications can be made in construction and arrangement within the scope of the invention as defined in the appended claims.

What is claimed is:

1. In a navigation system having distance measuring equipment of the type providing a range information signal representing measured range with respect to a fixed geographical reference location in response to an interrogating signal and a very high frequency omnirange bearing measuring instrument of the type provided bearing information relative to said geographical reference location in the form of a pair of variable phase signals and a reference signal, means to integrate said information in a manner to provide continuous visual display of the position of an aircraft with respect to said geographical reference location comprising: a source of timing pulses, a first selsyn system comprising a transmitting stator and rotor and a receiving stator deflection means, a selsyn motor having a stator and rotor, said rotor mechanically connected to said first selsyn transmitter rotor, circuit means connecting said pair of variable phase bearing information signals to respective field coils of said selsyn motor stator and said reference signal to said selsyn motor rotor respectively, means responsive to said timing pulse source for generating a sweep signal having an amplitude which increases linearly with respect to time, means for applying said sweep signal to said first selsyn transmitter rotor, a cathode-ray display tube having an electron beam, and means for modulating the cathode-ray beam of said display tube with said distance measuring equipment range information signal.

2. A navigational aid as defined in claim 1 in which said timing pulse source periodically generates a first initiating signal for initiating said distance measuring equipment and in which said distance measuring equipment provides a range information signal which is time delayed with respect to said initiating signal, means coupled to said sweep means for synchronizing the incidence of said beam sweep at the center of said tube face with said initiating signal.

References Cited in the file of this patent

UNITED STATES PATENTS

| | | |
|---|---|---|
| 2,520,595 | Fernsler | Aug. 29, 1950 |
| 2,545,754 | Thompson | Mar. 20, 1951 |
| 2,666,198 | Wallace | Jan. 12, 1954 |
| 2,705,793 | Litchford | Apr. 5, 1955 |
| 2,727,229 | Anas et al. | Dec. 13, 1955 |